(12) United States Patent
Wang et al.

(10) Patent No.: US 7,237,938 B2
(45) Date of Patent: Jul. 3, 2007

(54) BACKLIGHT MODULE

(75) Inventors: Bily Wang, Hsin Chu (TW); Jonnie Chuang, Pan Chiao (TW); Chuanfa Lin, Shu Lin (TW)

(73) Assignee: Harvatek Corporation, Hsin Chu (TW)

( * ) Notice: Subject to any disclaimer, the term of this patent is extended or adjusted under 35 U.S.C. 154(b) by 134 days.

(21) Appl. No.: 11/088,791

(22) Filed: Mar. 25, 2005

(65) Prior Publication Data

US 2006/0215387 A1    Sep. 28, 2006

(51) Int. Cl.
*F21V 8/00* (2006.01)
(52) U.S. Cl. ............... 362/612; 362/606; 362/608; 362/609
(58) Field of Classification Search ........ 362/600, 362/606, 607, 608, 609, 612, 615, 620, 621, 362/623–624
See application file for complete search history.

(56) References Cited

U.S. PATENT DOCUMENTS 6,536,914 B2 * 3/2003 Hoelen et al. .............. 362/231
6,964,500 B2 * 11/2005 Sakai .......................... 362/276

* cited by examiner

*Primary Examiner*—Laura Tso
(74) *Attorney, Agent, or Firm*—Troxell Law Office, PLLC

(57) ABSTRACT

A backlight module arranged under a flat display includes a printed circuit board being parallel to the flat display and including a plurality of LEDs, a reflection portion being a reflection wall bent from a fringe of the LEDs to extend over the LEDs, and a guide light plate being parallel to the printed circuit board. The reflection portion includes an orientation wall parallel to the reflection wall and an outlet with a direction parallel to the printed circuit board. The guide light plate has an end connecting inside the outlet of the reflection portion, a light delivering surface adjacent to the flat display, and a reflection surface arranged at a bottom thereof.

9 Claims, 3 Drawing Sheets

BACKLIGHT MODULE

BACKGROUND OF THE INVENTION

1. Field of the Invention

The present invention relates to a backlight module, and particularly relates to a backlight module applied with an LED light source, in order to accommodate with a flat display, like a LCD.

2. Background of the Invention

An LCD (Liquid Crystal Display) is characterized by its low power consumption, low driving voltage, thinness and light weight, and is further used broadly as a flat display. Although the liquid crystal layer of the LCD cannot radiate per se, a light source is provided to light the display. Because of the light source behind the liquid layer, it is thereby called a backlight module.

Furthermore, a LED (Liquid Emitting Diode) is a lighting member with high luminance and low power consumption. The LED provides a stable light source with a long service life, so as to provide lighting for the LCD.

Referring to FIG. 1, a cross-sectional profile of a conventional backlight module 9 with an LED light source is illustrated. The backlight module 9 includes a printed circuit board 91, a plurality of LEDs 92 arranged on the printed circuit board 91 and a first reflection portion 93 adjacent to the LEDs 92. The first reflection portion 93 has an elliptic reflection wall that reflects light from the LEDs to a mixing plate 94. The mixing plate 94 extends from the first reflection portion 93, mixes up all reflected light to guide it to a second reflection portion 95, which guides the light turning at 180 degree to a LGP 97(light guide plate). The light is then finally reflected by a reflective foil 96 that is originally disposed under the LGP 97, to a liquid crystal display 8.

FIG. 2 illustrates a perspective view of the conventional backlight module 9, the mixing plate 94 is disposed due to the LEDs 92 which are various colors. The mixing plate 94 and the LGP 97 are assembled in a stack manner. Notwithstanding, the conventional backlight module 9 is difficult to accommodate with a new electronic product owing to their thinner size and the weight light requirements.

In addition, there is also a conventional related art that includes a LED arranged by a side of a LGP; a printed circuit board is orthogonal to a liquid crystal layer. But, in such designs, heat generated from the LED dissipates away incompletely.

Hence, an improvement over the prior art is required to overcome the disadvantages thereof.

SUMMARY OF INVENTION

The primary object of the invention is therefore to specify a backlight module that is thin with fewer elements arranged therein, in order to decrease costs, and is compatible with new developments.

According to the invention, the objective is achieved by a backlight module arranged under a flat display that includes a printed circuit board being parallel to the flat display and including a plurality of LEDs, a reflection portion being a reflection wall bent from a fringe of the LEDs to extend over the LEDs, and a guide light plate being parallel to the printed circuit board. The reflection portion includes an orientation wall parallel to the reflection wall and being an outlet with a direction parallel to the printed circuit board. The guide light plate has an end connecting inside the outlet of the reflection portion, a light delivering surface adjacent to the flat display, and a reflection surface arranged at a bottom thereof.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE EMBODIMENTS

Figure 1:
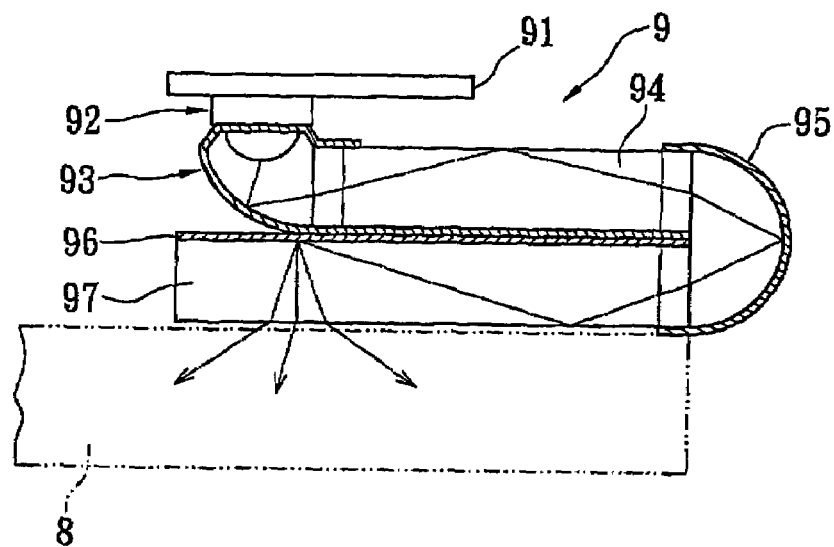
FIG. 1 is a cross-sectional profile of a conventional backlight module with an LED light source.
Figure 2:
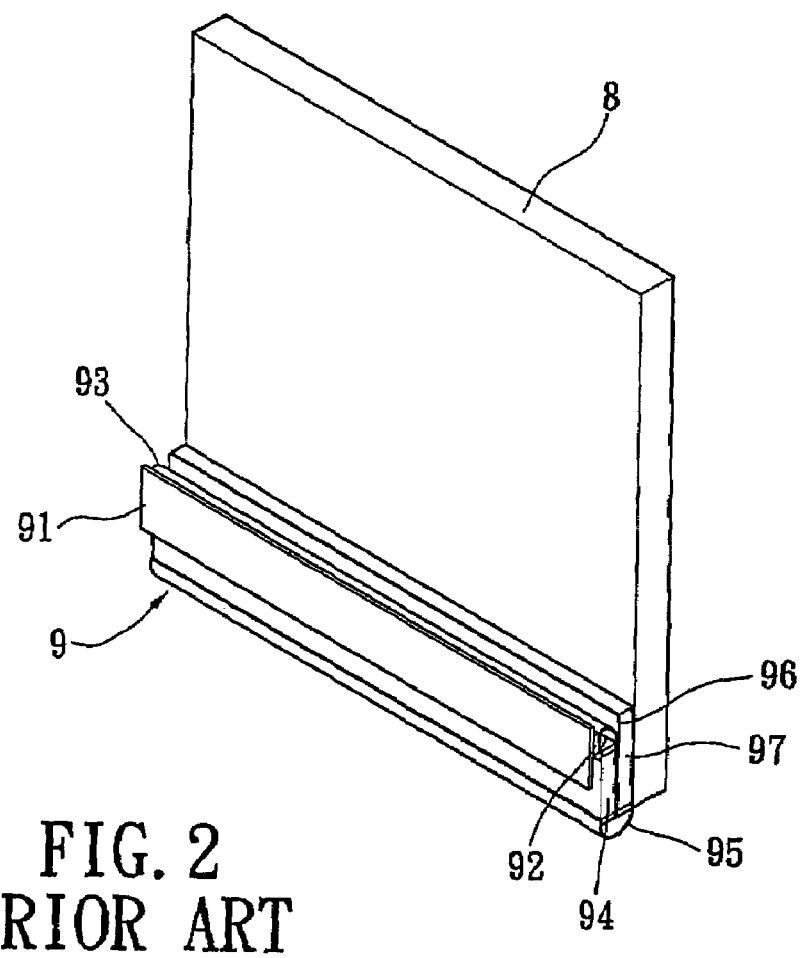
FIG. 2 is a perspective view of the conventional backlight module assembled with a liquid crystal display.
Figure 3:
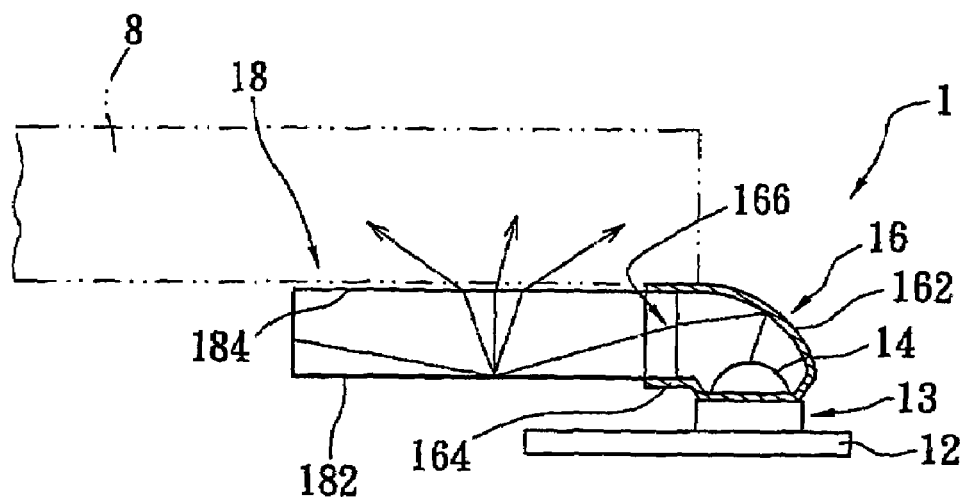
FIG. 3 is a cross-sectional profile of a backlight module according to the present invention.
Figure 4:
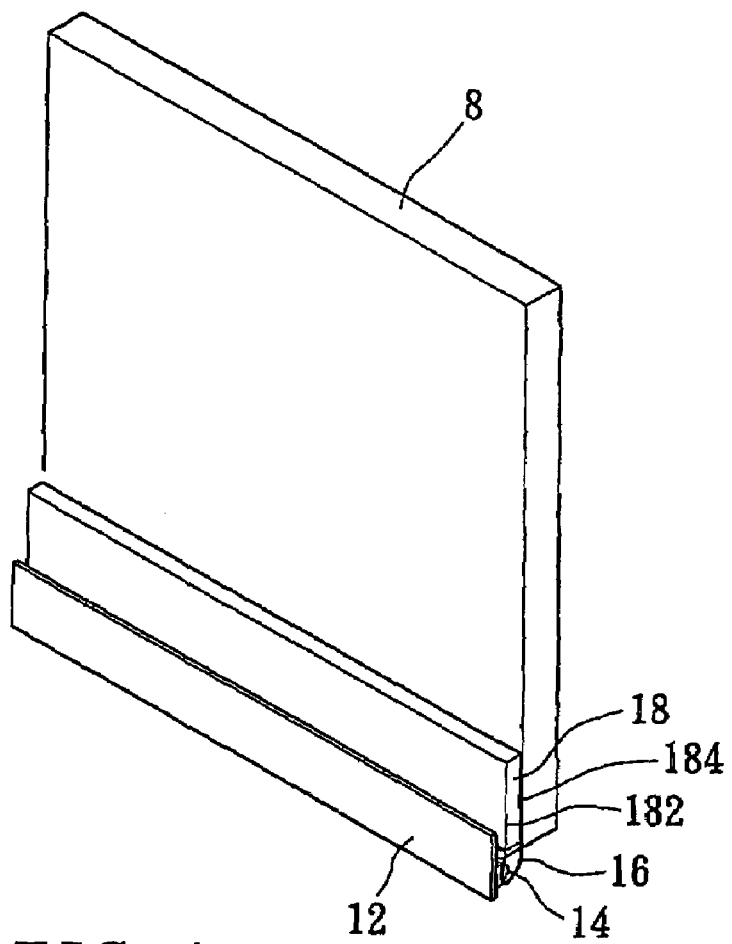
FIG. 4 is a perspective view of the backlight module assembled with a liquid crystal display according to the present invention.

With respect to FIGS. 3 and 4, a backlight module 1 is arranged under a flat display 8. The backlight module 1 includes a printed circuit board 12, a plurality of LEDs 14, a reflection portion 16 and a guide light plate 18. The printed circuit board 12 is parallel to the flat display 8. The printed circuit board 12 can be a rigid board or a resilient board. The LEDs 14 are arranged on the printed circuit board 12. The printed circuit board 12 is disposed outside the flat display 8, in order to dissipate heat away from the LEDs 14.

The LEDs 14 are properly processed with SMT (surface mount technology) as SMD, so as to be soldered on the printed circuit board 12. This kind of arrangement of the LEDs 14 shrinks their size and the volume thereof. In this embodiment, the LEDs 14 are white LEDs, or the LEDs 14 provide mixed light. The quantity of the LEDs 14 depends on the illumination of the flat display 8.

The reflection portion 16 is disposed over the LEDs 14, in order to reflect light to vertically deliver it onto the guide light plate 18. The reflection portion 16 includes a reflection wall 162 and an orientation wall 164. The reflection wall 162 is shaped as an ellipse and extends curvedly from a fringe of the LEDs 14 over the LEDs 14. The orientation wall 164 is parallel to the reflection wall 162 and has an outlet 166 with a direction parallel to the printed circuit board 12. The reflection wall 162 is made of materials with excellent reflectivity, or the reflection wall 162 is coated with reflection-enhanced materials.

The printed circuit board 12 further includes a holder 13, and the LEDs 14 are arranged on the holder 13. The reflection portion 16 can connect to the holder 13, too.

Alternatively, the reflection portion 16 can connect to the printed circuit board 12 directly, for example, being soldered or screwed on.

The guide light plate 18 is parallel to the printed circuit board 12 and has an end connecting inside the outlet 166 of the reflection portion 16, a light delivering surface 184 adjacent to the flat display 8, and a reflection surface 182 arranged at a bottom thereof. The guide light plate 18 is made of PC (plastic division) or PMMA (Polymethylmethacrylat) with 50%~80% diffuser particles of TiO2, which scatters light transmitting in the guide light plate 18 uniformly.

Figure 5:
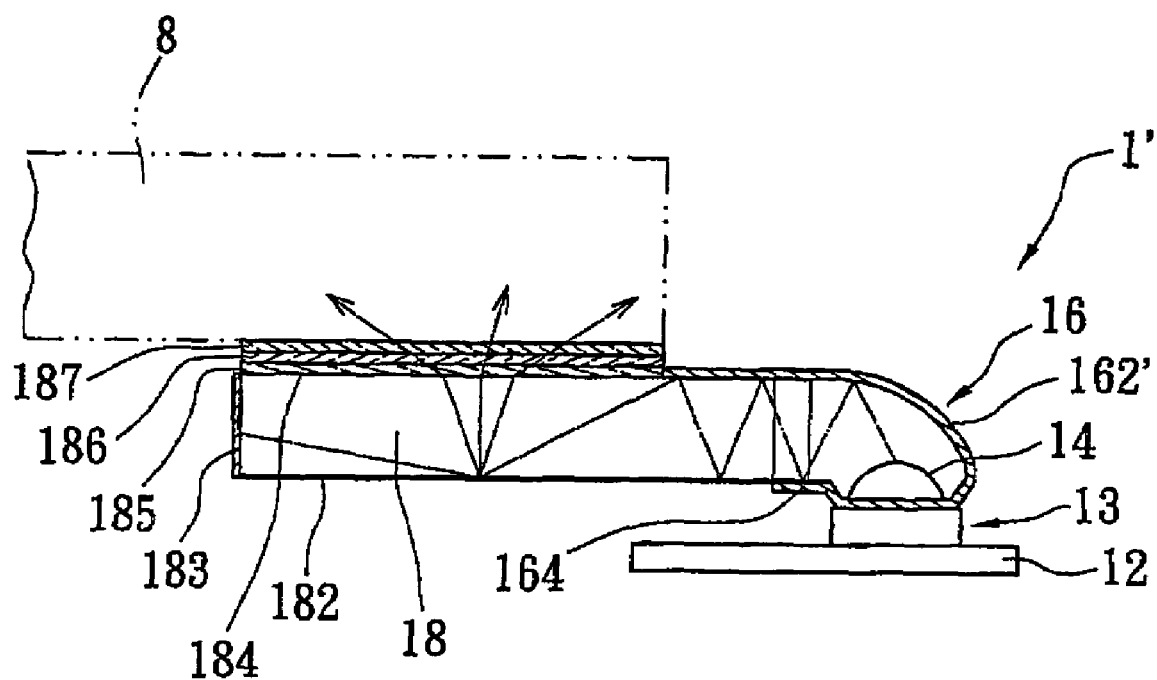
FIG. 5 is a cross-sectional profile of the backlight module of another embodiment according to the present invention.

FIG. 5 shows the LEDs 14 selectively mixed with three colors red, green and blue. For mixing up the three colors, the reflection wall 162' of the reflection portion 16 further includes a predetermined length extended forwardly over the guide light plate 18, so that the light mixes up in advance at a prior section of the guide light plate 18 and emits outwardly at a post section of the guide light plate 18.

The backlight module 1' further includes a first diffuser sheet 185 arranged over the light delivering surface 184 of the guide light plate 18, a prism sheet 186 arranged over the first diffuser sheet 185 and a second diffuser sheet 187 arranged over the prism sheet 186. The guide light plate 18 further includes a reflection plate 183 disposed by a side thereof.

Advantages of the present invention are summarized as follows: to shrink the size thereof and decrease the number of elements arranged therein, so as to decrease costs and be compatible with new developments.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A backlight module arranged under a flat display, and comprising:

a printed circuit board being parallel to the flat display and including a plurality of LEDs configured to directly emit white light;

a reflection portion being a reflection wall bent from a fringe of the LEDs to extend over the LEDs, and including an orientation wall parallel to the reflection wall and being an outlet with a direction parallel to the printed circuit board; and a guide light plate being parallel to the printed circuit board, and the guide light plate having an end connecting inside the outlet of the reflection portion, a light delivering surface adjacent to the flat display, and a reflection surface arranged at a bottom thereof.

2. The backlight module as claimed in claim 1, wherein the LEDs are in SMD (Surface Mounting Device) types.

3. The backlight module as claimed in claim 1, wherein the reflection wall of the reflection portion further includes a predetermined length extended forwardly over the guide light plate.

4. The backlight module as claimed in claim 1, wherein the reflection wall of the refection portion is coated with reflection-enhanced materials.

5. The backlight module as claimed in claim 1, wherein the printed circuit board further includes a holder, and the LEDs are arranged on the holder.

6. The backlight module as claimed in claim 5, wherein the reflection portion connects to the holder.

7. The backlight module as claimed in claim 1, wherein the reflection portion connects to the printed circuit board directly.

8. The backlight module as claimed in claim 1, wherein the guide light plate is made of PC (plastic division) or PMMA (Polymethylmethacrylat).

9. The backlight module as claimed in claim 1, further including a first diffuser sheet arranged over the light delivering surface of the guide light plate, a prism sheet arranged over the first diffuser sheet and a second diffuser sheet arranged over the prism sheet.

\* \* \* \* \*